June 27, 1967

T. F. SARAH 3,327,962

ACTUATING MECHANISM FOR THE LINE
PICKUP IN SPINNING REELS

Filed Aug. 24, 1965

INVENTOR.
THOMAS F. SARAH
BY Hamilton & Cook
ATTORNEYS

INVENTOR.
THOMAS F. SARAH
BY Hamilton & Cook
ATTORNEYS

INVENTOR.
THOMAS F. SARAH
BY Hamilton & Cook
ATTORNEYS

INVENTOR.
THOMAS F. SARAH
BY *Hamilton & Cook*
ATTORNEYS

United States Patent Office 3,327,962
Patented June 27, 1967

3,327,962
ACTUATING MECHANISM FOR THE LINE
PICKUP IN SPINNING REELS
Thomas F. Sarah, Akron, Ohio, assignor to Pflueger
Corporation, Akron, Ohio, a corporation of Ohio
Filed Aug. 24, 1965, Ser. No. 482,174
12 Claims. (Cl. 242—84.2)

The present invention relates generally to fishing reels of the spinning type. More particularly, the present invention relates to fishing reels having a normally nonrotatable spool and a radially enclosed flyer to wind the line onto the spool. Specifically, the present invention relates to the actuation of the line pickup device whereby to snub the line preparatory to the cast, release the line for the cast, selectively snub the line after the cast and wind the line onto the spool during the retrieve.

The spinning reel with its normally nonrotatable spool from which the line uncoils during the cast has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open faced or closed face characteristic refers to the exposure of the spool. The closed reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing rod traveling in almost a straight line and therefore there is little or no opportunity for the line to tangle itself about the line guide on the rod. However, so confining the coils does add to the frictional resistance against the line as it pays out. In open faced reel constructions there is either no cover cap at all or the cover cap has an eyelet of relatively large diameter and the coils peeling off of the spool during the cast are not confined within the reel, thus reducing friction at the reel. However, the line is often still in a partial coil as it reaches the first guide line on the rod and the first guide line must therefore be of increased diameter to reduce friction. With open faced reels it is found necessary to provide at least the first line guide with sloping protectors extending from the rod to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top, or upper side, of the rod, he is using an overmounted reel. If the reel is underneath, or on the lower side, of the rod, he is using an undermounted reel.

The finger snubbed reel requires that the fisherman use one or more fingers to engage, or snub, the line both to control the release and flight of the line. Most early spinning reel constructions embodied this concept. However, these constructions generally required the fisherman to use two hands in preparing the reel for the cast. To facilitate the ease of operation, constructions were developed wherein the line was mechanically snubbed by pinching the line between two elements. Such constructions were operative by one hand, but the pinching of the line both to prevent the line from paying off the spool until the desired time in the casting procedure and to snub the line at the desired time after the cast to control the flight subjected the line to serious abrading.

It is therefore an object of the present invention to provide a mechanism capable of snubbing the line preparatory to the cast, releasing the line for the cast and selectively snubbing the line after the cast for controlling the flight without pinching, or otherwise abrading, the line.

It is another object of the present invention to provide a mechanism, as above, whereby the pickup device, normally used for winding the line onto the spool during the retrieving operation, is also actuated to snub the line preparatory to the cast, to release the line at the cast and selectively to snub the line after the cast for controlling the flight of the line.

It is still another object of the present invention to provide a mechanism for actuating the pickup device, as above, by the fingers of the casting hand.

It is a further object of the present invention to provide an actuating mechanism for the pickup device, as above, which can be as readily used with an open or closed face reel, an undermounted or overmounted reel, and any combination thereof.

It is a still further object of the present invention to provide a mechanism for the actuation of the pickup device, as above, which is relatively uncomplicated and economical to produce.

These and other objects of the invention, as well as the advantages thereof over existing and prior art forms, will be apparent in view of the following detailed description of the attached drawings and are accomplished by means hereinafter described and claimed.

One preferred, and one alternative, embodiment is shown by way of example in the accompanying drawings and hereinafter described in detail without attempting to show all of the various forms and modifications in which the invention might be embodied; the invention being measured by the appended claims and not by the details of the specification.

Figure 1:
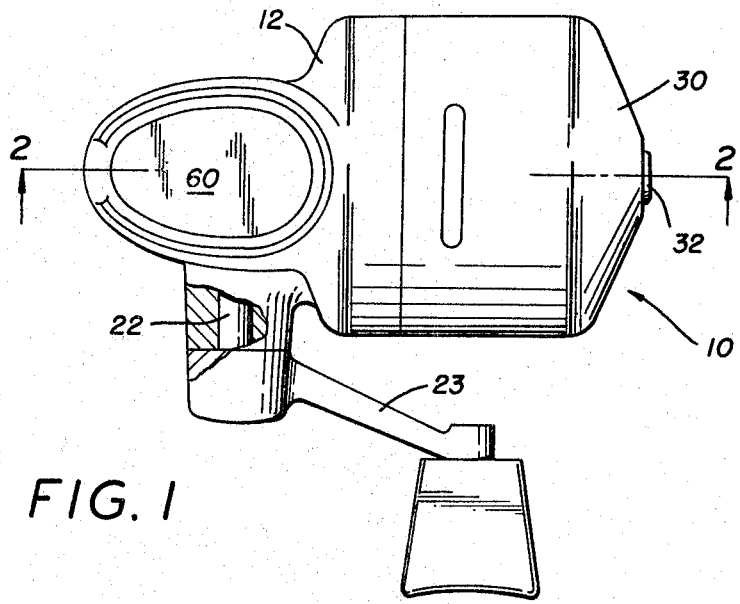
FIG. 1 is a top plan view of a spinning reel embodying the concept of the present invention.
Figure 2:
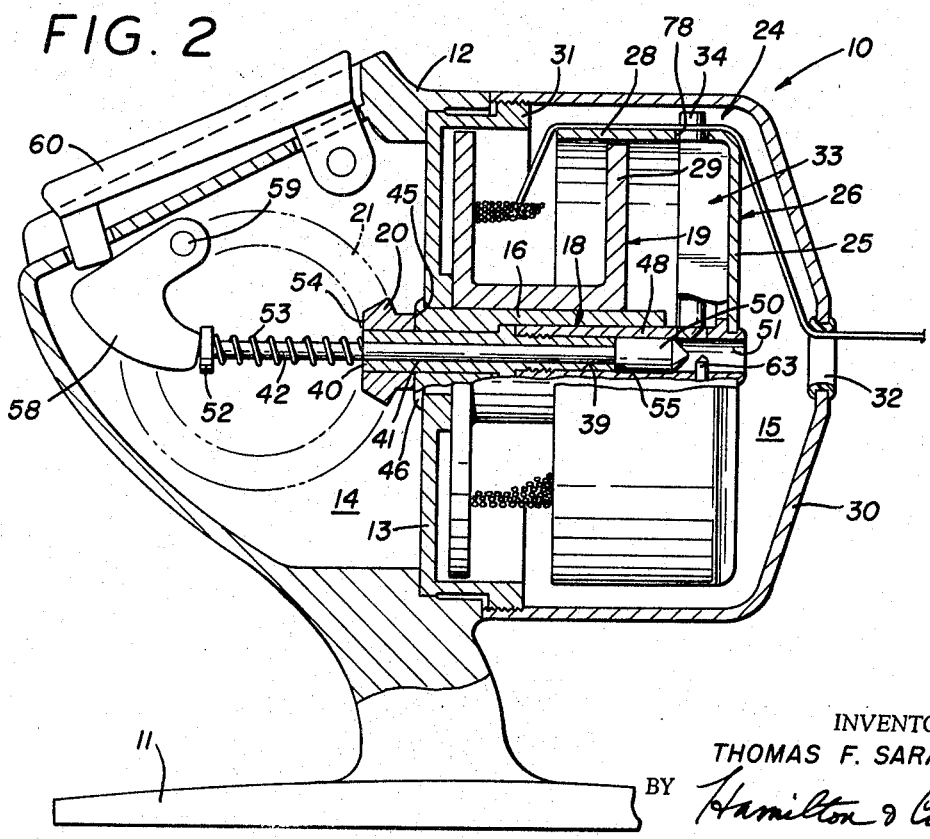
FIG. 2 is an enlarged cross section taken substantially on line 2—2 of FIG. 1.

In general, a reel constructed according to the concept of the present invention has a normally nonrotatable spool carried within the reel housing with a rotatable enclosed flyer mounted adjacent the outer, or line access, side of the spool. The flyer is comprised of a cup-shaped carrier, a holder and a pickup head rotatable to pick up and coil the line onto the spool during the line retrieving operation.

The holder is mounted on the carrier to be slidable from a radially inner to a radially outer position. A spring means biases the holder toward the outer position where it causes the pickup head to extend radially outwardly of the carrier. A plunger is axially slidably mounted in the housing and operative, by control means from exteriorly of the housing, to slide the holder to the radially inner position. A latch mechanism retains the holder in the radially inner position but permits selective release thereof upon rotation of the flyer to retrieve and wind the line onto the spool.

The pickup head is actuated by a lifter rod slidable axially of itself with and with respect to the holder. The aforesaid plunger engages the lifter rod to maintain, or extend, the pickup head radially outwardly of the carrier as the plunger moves axially to engage the holder and move it to the radially inner position. Upon release of the control means a spring means biases the plunger out of contact with both the holder and the lifter rod, and a further spring means retracts the pickup head to permit the line to uncoil for the cast.

Referring more particularly to the drawings, the improved reel, indicated generally by the numeral 10, is detachably mounted to a rod, not shown, in the well-known manner by a mounting shoe 11 spaced outwardly of the housing 12.

The housing 12 is divided by an integral partition wall 13 into a gear compartment 14 and a spool compartment 15. A cover plate, not shown, on the side of the rear, preferably flattened, portion of the housing containing the gear compartment 14 provides access thereto.

Fixed to and extending forwardly of the partition wall 13 is a tubular bearing 16. Interiorly of the bearing 16 a drive shaft 18 is mounted for rotation. Exteriorly of the bearing 16 a line spool 19 is supported. The line spool is generally nonrotatable but may be selectively rotatable against the action of the drag mechanism, not shown, or may also be axially slidable in conjunction with a level wind mechanism, also not shown.

The rear portion of the drive shaft extends through the partition wall 13 into the gear compartment 14 and mounts a bevel pinion 20 thereon. A bevel drive gear 21 meshes with pinion 20 and is mounted on a shaft 22 for rotation by the crank handle 23. The usual brake means and anti-reversing pawls may also be used, but since they form no part of the present invention and are not necessary to an environmental understanding of the present invention, they have not been depicted.

A flyer, indicated generally by the numeral 24, is fixedly mounted on the forward end of the drive shaft 18 for rotation therewith. Specifically, the base 25 of the cup-shaped carrier 26 is swaged, or otherwise suitably attached to, the drive shaft 18. The skirt 28 of the carrier 26 extends rearwardly over the front flange 29 of the spool 19.

A cap 30 is attached to the housing 12 to complete the spool compartment 15. The cap 30 may be attached to the housing in a number of ways. For example, it may be screwed onto the annular flange 31, as shown. The forward portion of the cap 30 is provided with a line guide, or eyelet, 32. The purpose of the eyelet 32 is merely to guide the line inwardly and outwardly of the spool compartment 15 and may therefore be of relatively small diameter, as shown, or may, if preferred, be of much larger diameter.

The above-described structure is well-known to the art and forms no part of the present invention, the description being set forth merely to provide an environmental understanding.

Figure 3:
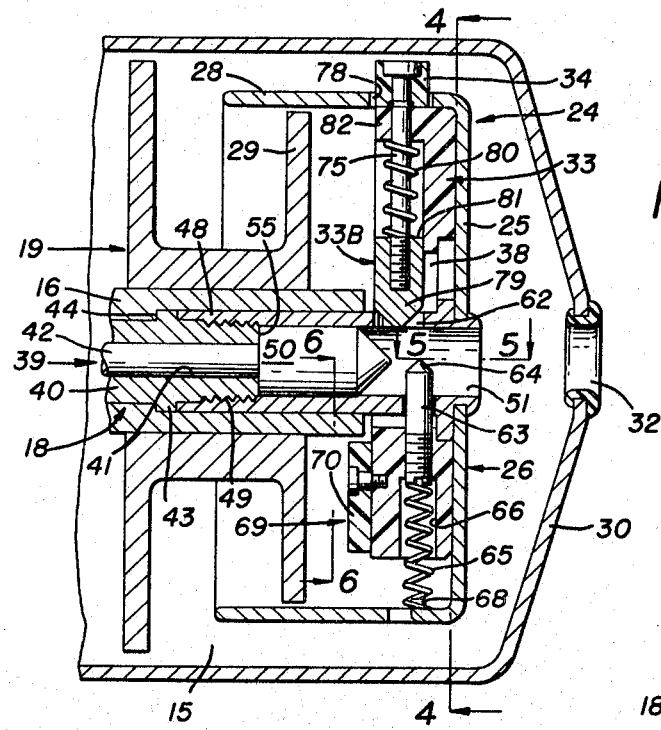
FIG. 3 is a further enlarged fragmentary area of FIG. 2 depicting the pickup holder in the radially outer position with the pickup head extended to wind the line onto the spool.
Figure 4:
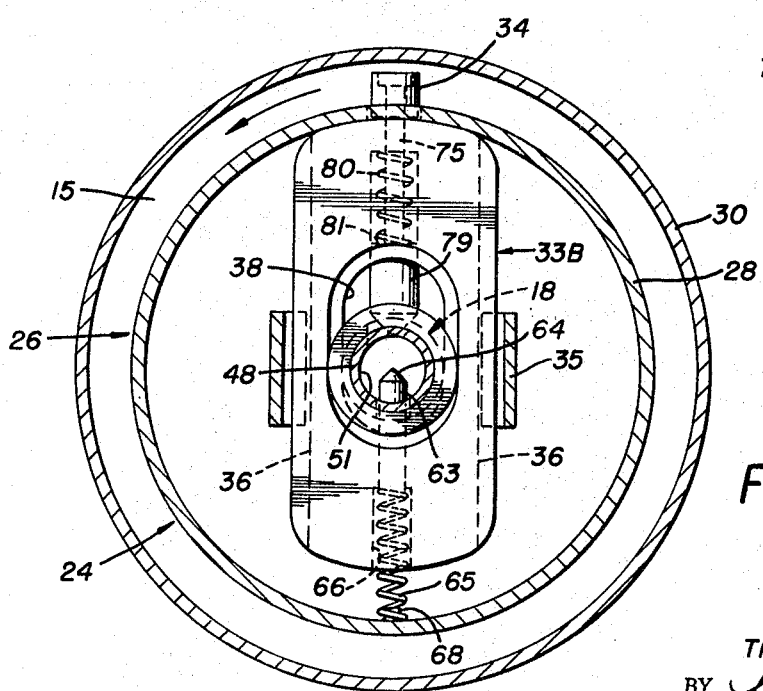
FIG. 4 is a cross section taken substantially on line 4—4 of FIG. 3.
Figure 5:
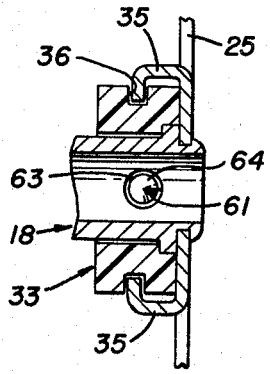
FIG. 5 is a cross section taken substantially on line 5—5 of FIG. 3.

In addition to the carrier 26, the flyer 24 comprises a unique holder 33 and pickup head 34. As shown in FIG. 5, the holder 33 is slidably mounted on the base 25 of the carrier 26, as by the track flanges 35 stamped from the base 25 which engage slots 36 on the side of the holder 33. With such an arrangement the holder can slide between the radially inner position 33A, depicted in FIGS. 7 and 9, and the radially outer position 33B depicted in FIG. 3. As shown in FIG. 4 the holder 33 is conveniently rectangular with a medial, generally elliptic, or elongated, opening 38 through which the drive shaft 18 is slidably received.

The drive shaft 18 is also sufficiently tubular to receive an axially slidable plunger 39 therein. As shown, the drive shaft may be comprised of two sections, the first section 40 being provided with an axial bore 41 in which is slidably received a plunger rod 42. A belted rib 43 on the radially outer periphery of the first section 40 engages a shoulder 44 formed on the inner surface of the tubular bearing 16 to maintain the first shaft section 40 against rearward axial displacement. The forward face 45 of the pinion 20 engages a boss 46 on the rearmost face of bearing 16 to prevent forward axial displacement of the first shaft section 40.

The sleevelike second shaft portion 48 may be attached to the first shaft section 40, as by the threaded attachment 49. A plunger head 50 on the forward end of the plunger rod 42 is reciprocally slidably received in the interior 51 of the tubular shaft section 48.

The rearmost end of the plunger rod 42 has a radially extending cap portion 52 and a compression spring 53 which encircles the rod 42 and extends between the rearmost face 54 of the bevel pinion 20 and the cap portion 52 biasingly to urge the plunger head 50 rearwardly against the stop surface 55 formed on the forward face of the first shaft section 40.

A lever arm 58 is rockably mounted on a stud shaft 59 in the gear compartment 14 so as to be actuated by a push button 60 mounted to be operative from exteriorly of the housing 12. The control means comprising the push button 60 and the lever arm 58 operate to move the plunger head 50 forwardly against the rearward biasing action of spring 53.

Figure 7:
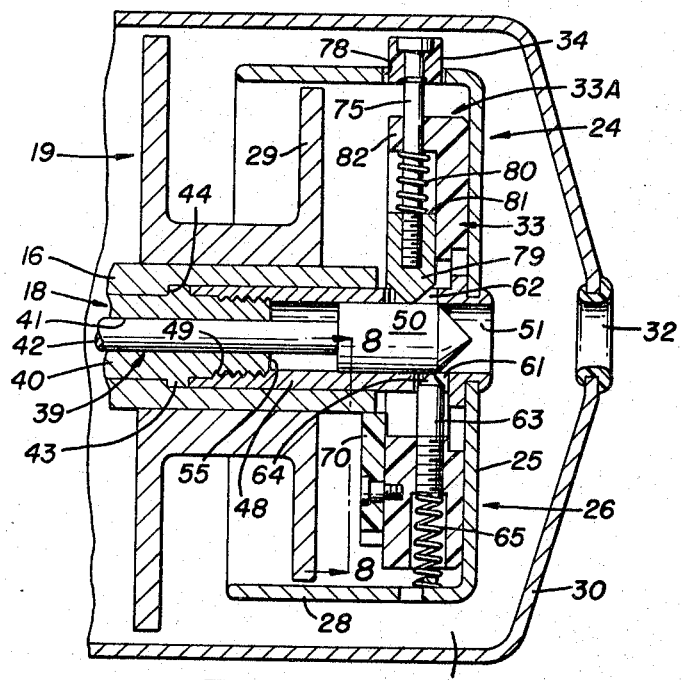
FIG. 7 is a view similar to FIG. 3 depicting the pickup holder moved to the radially inner position with the pickup head maintained in extended position for snubbing the line.

In the forwardmost position of the plunger 39, FIG. 7, the plunger head 50 blocks diametrically opposed access bores 61 and 62 and in the rearmost position of the plunger 39, the plunger head 50 clears both bores 61 and 62.

Figure 9:
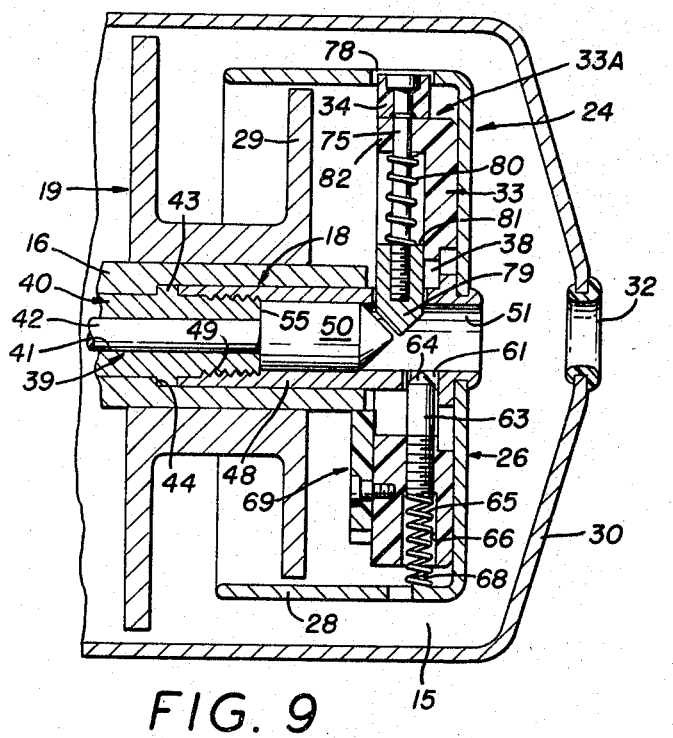
FIG. 9 is a view similar to FIG. 7 depicting the pickup head retracted.

A tumbler pin 63 is carried on said holder 33 in axial alignment with access bore 61. Tip 64 of tumbler pin 63 enters into the interior 51 of the tubular second shaft portion 48 when the holder is in the radially outer position 33B depicted in FIG. 3. However, as shown in FIGS. 7 and 9, the tip 64 of the tumbler pin 63 clears the interior 51 of the shaft section 48 when the holder is in the radially inner position 33A. Thus, the cooperative arrangement of the plunger head 50 with the tip 64 of the tumbler pin 63 will move the holder 33 from the radially outer position 33B to the radially inner position 33A. For this purpose, the tip 64 and the head 50 have matingly beveled work surfaces so that axially forward movement of the plunger 39 will cause the tumbler pin 63 to move radially away from the plunger. This radially inward movement of the holder 33 compresses a spiral compression spring 65 adapted biasingly to urge the holder 33 toward the radially outer position 33B. As shown, the spring 65 may extend between a receiving bore 66 in the holder 33 and a positioning tab 68 punched radially inwardly from the skirt 28 of the carrier 26.

Figure 6:
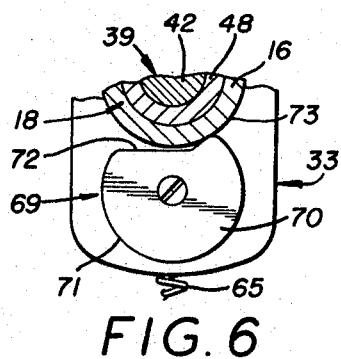
FIG. 6 is an enlarged cross section taken substantially on line 6—6 of FIG. 3.
Figure 8:
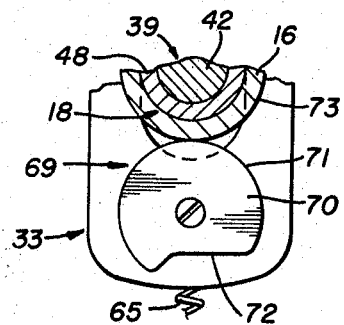
FIG. 8 is an enlarged cross section taken substantially on line 8—8 of FIG. 7.
Figure 10:
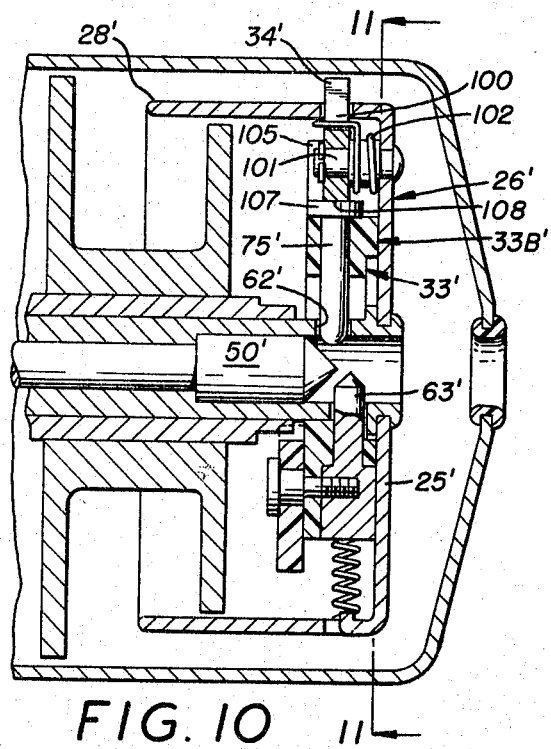
FIG. 10 is a view similar to FIG. 3 depicting an alternative construction.
Figure 11:
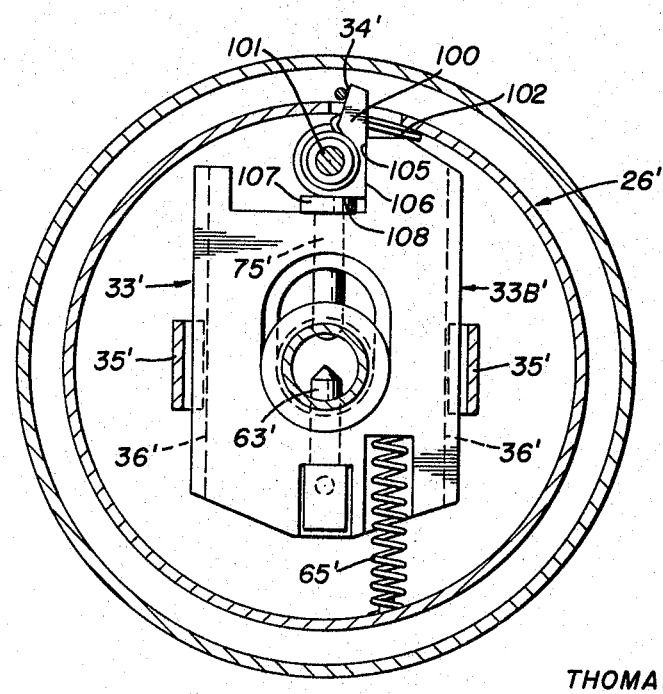
FIG. 11 is a cross section taken substantially on line 11—11 of FIG. 10.

A latch mechanism 69 is carried on the holder 33 for retaining said holder in the radially inner position 33A against the biasing action of spring 65 and for selectively releasing said holder. While no particular latch construction is critical to the operation of the subject pickup actuating mechanism, that shown in my Patent No. 3,226,051, filed Mar. 4, 1964, has proven highly efficient. Reference to the aforesaid patent may be had for a detailed description of that latch mechanism. Briefly, however, such a latch mechanism comprises a lock drum 70 mounted on the holder 33 to be slidable therewith and independently rotatable. As best seen in FIGS. 6 and 8, the lock drum 70 has an annular periphery 71 with a relieved portion 72. The periphery of the drum 70 is cooperatively positioned radially of a blocking means formed by the forwardmost radial surface 73 of bearing 16. When the holder is in the radially outer position 33B, the relieved portion 72 is disposed opposite the radial surface 73 of the bearing 16 (FIG. 6).

When the holder is moved from the outer position 33B to the inner position 33A, the lock drum is rotated, as by a coil spring, not shown, until the annular periphery 71 engages said bearing 16 (FIG. 8). This maintains the holder in the inner position 33A against the biasing action of the spring 65. Upon rotation of the carrier 28 separate means, such as the frictional engagement between the annular periphery 71 of the lock drum 70 and the bearing 16, drivingly rotates the drum 70 until the relieved portion 72 is disposed opposite the bearing 16 and the spring 65 can force the holder to the radially outer position 33B.

A lifter rod 75 is carried on said holder 33 in axial alignment with the access bore 62. In the preferred embodiment the pickup head 34 is secured to and made a part of the radially outermost end of lifter rod 75. The pickup head 34 is extensible radially outwardly of, and retractable radially inwardly of, the carrier skirt 28 through a radial bore 78 therein. The radially innermost end of the lifter rod 75 carries a tip 79 beveled similarly to the tip 64 on tumbler pin 63 for cooperative engagement with the plunger head 50. A spiral compression spring 80 encircles the lifter rod 75 between the shoulder 81 on the tip portion 79 and the flange 82 on the holder 33 through which the lifter rod 75 is slidably mounted. The spring 80 forces the lifter rod radially inwardly biasingly to maintain the pickup head 34 against the radially outer surface of the holder flange 82. As can be seen by comparing FIGS. 3 and 9, the axial dimension of the lifter rod 75 is such that with the pickup head 34 abutting the holder flange 82 the tip 79 enters into the interior 51 of the shaft section 48 when the holder is in the inner position 33A and clears the interior 51 when the holder is in outer position 33B.

A fisherman would operate this reel as follows: To prepare the reel for casting a lure the fisherman would apply pressure to the push button 60. This moves the plunger head 50 forwardly within the second shaft portion 48 to a position opposite the radially inner end of the access bores 61 and 62. Contact by the plunger head 50 with the tip 64 of the tumbler pin 63 moves the holder 33 to the radially inner position 33A wherein it is locked by the latch mechanism 69. At the same time, the plunger head 50 blocks entrance of the lifter rod tip 79 into the interior 51 of the tubular shaft portion 48 so that the holder moves with respect to the lifter rod 75 and the pickup head 34 remains extended radially exteriorly of the carrier skirt 28 to maintain the line snubbed thereagainst.

The pressure against the push button 60 which initiated the above sequence is maintained until that moment during the cast when the fisherman desires to release the line. By releasing his pressure against button 60, the spring 80 biases the pickup head 34 to retracted position within the carrier skirt 28, as shown in FIG. 9, and the line can freely uncoil, or peel, off the spool 19.

If desired, the fisherman may stop the cast at any time during the flight of the lure simply by again depressing the button 60 and thereby moving the plunger head 50 forwardly against the tip 79 of the lifter rod 75. The cooperative action therebetween moves the pickup head 34 radially outwardly to snub the line and limit the extent of the cast.

When rewinding is started by turning the crank handle 23, the drive shaft 18 rotates the carrier 26 and the holder 33 which supports the latch mechanism 69 in the direction of the arrow in FIG. 4. The annular periphery 71 of the lock drum 70 "walks" around the radial surface 73 of the fixed bearing 16 until the relieved portion 72 is disposed oppositely thereto. At that point the spring 65 moves the holder from the inner position 33A to the outer position 33B and this extends the pickup head 34 radially outwardly of the carrier skirt 28 so that continued rotation of the crank handle 23 causes the head 34 to wind the line onto the spool 19.

Because it is required to maintain the pickup head 34 extended while the holder is slid from the outer position 33B to the inner position 33A, it is necessary that the plunger head 50 block the tip 79 of the lifter 75 before engaging the tumbler pin 63 to move the holder 33 to its inner position. In the preferred embodiment the access bore 62 is therefore displaced axially of the access bore 61 toward the plunger head 50.

With the alternative embodiment, as shown in FIGS. 10–15, the operation is practically identical. However, the pickup head is not attached to, or carried by, the lifter rod. Instead the lifter rod 75' is freely carried in the modified holder 33' for slidable movement axially of itself.

The pickup head 34' is carried on the end of a pickup arm 100 rockably mounted on a stud 101 extending axially inwardly from the base 25' of the carrier 26'. A coil spring 102 acts between the carrier 26' and the pickup arm 100 biasingly to urge the pickup head 34' to a position retracted from the skirt 28' of carrier 26'.

Figure 12:
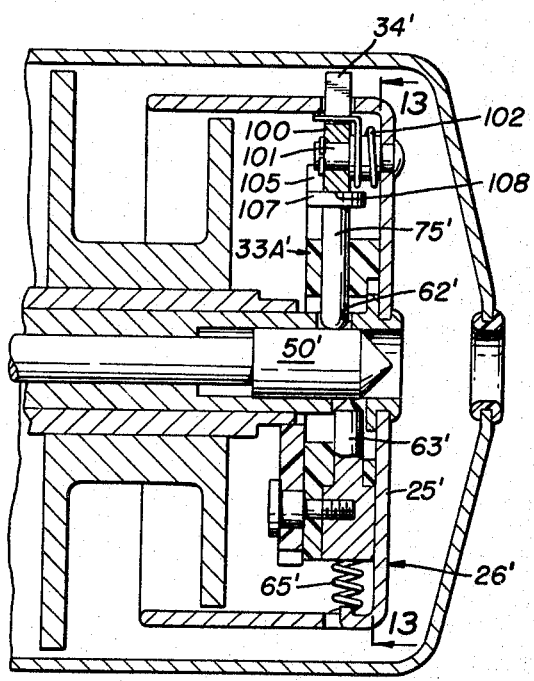
FIG. 12 is a view similar to FIG. 7 depicting the alternative construction shown in FIG. 10.
Figure 13:
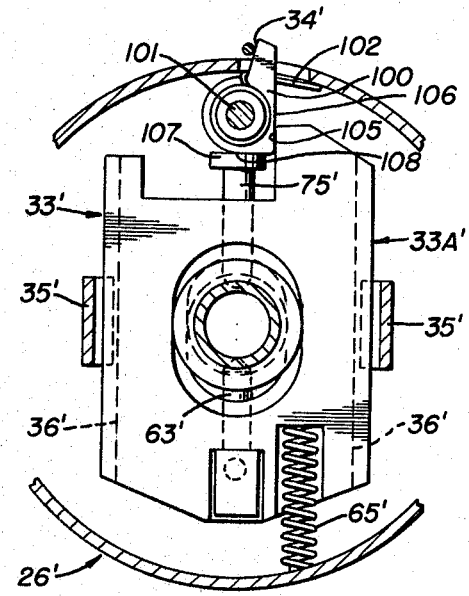
FIG. 13 is a cross section taken substantially on line 13—13 of FIG. 12.
Figure 14:
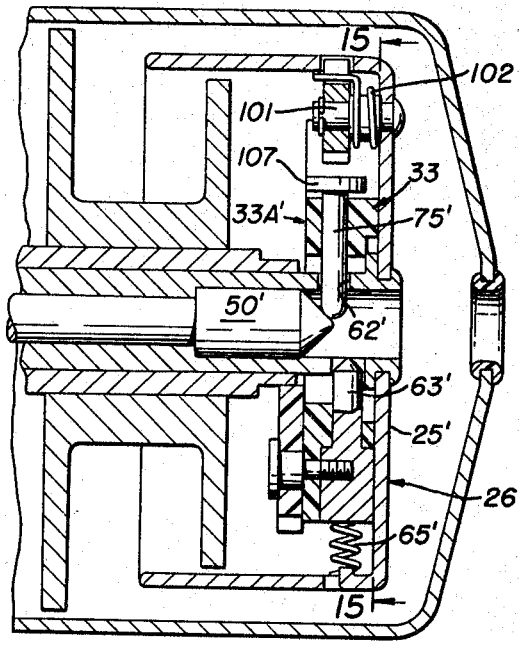
FIG. 14 is a view similar to FIG. 9 depicting the alternative construction shown in FIG. 10; and, FIG. 15 is a cross section taken substantially on line 15—15 of FIG. 14.
Figure 15:
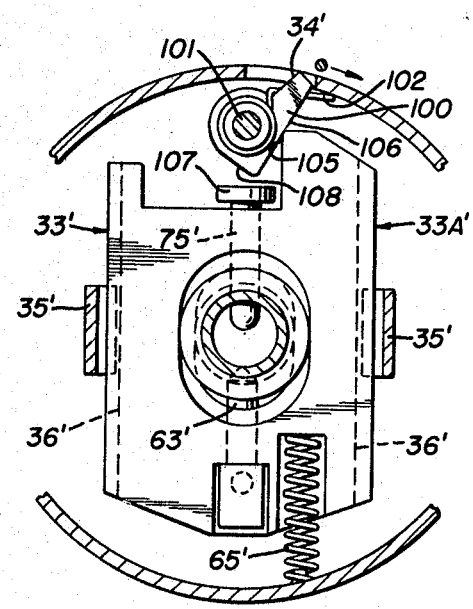

Therefore, as the holder is moved to the radially inner position 33A' by the action of plunger head 50' against the tumbler pin 63', the lifter rod 75' is blocked from entering access bore 62' and the pickup head 34' is retained in snubbing position (FIGS. 12 and 13). Upon withdrawal of the plunger head 50' the lifter rod 75' is freed and the spring 102 causes the pickup arm 100 to rotate to the position depicted in FIG. 15 with the head 34' retracted with respect to the carrier skirt 28'. The shoulder 105 on holder 33' prevents the pickup arm from rocking any more than is required to withdraw the head 34'.

The cooperative engagement of the shoulder 105 against the camming surface 106 on arm 100 as the holder moves from the radially inner position 33A' (FIGS. 14 and 15) to the radially outer position 33B' (FIGS. 10 and 11) rocks the arm 100 and thereby extends the head 34'. And, after the shoulder 105 on holder 33' moves radially outwardly beyond the pivot point (pin 101) of the arm 100, the pickup head 34', by the juxtaposition of the shoulder 105 to surface 106, is maintained in radially extended position. The mere biasing action of spring 65' through the lifter rod cap 107 and against the flattened base 108 of pickup arm 100 is not sufficient to retain the pickup head 34' extended, particularly when the line is resisting an axially directed force, as when playing a fish.

Because the force of spring 102, as applied to the holder 33' through the engagement of the cam surface 106 against shoulder 105, tends to induce a rotative moment in holder 33', it may be desirable to position the spring 65' eccentrically to relieve the resulting binding stresses between the flange track 35' and their receiving slot 36'.

It should therefore be apparent that a spinning reel embodying the concepts of the present invention utilizes the pickup head, which normally winds the line onto the spool during the retrieve, for snubbing the line preparatory to the cast, for releasing the line during the cast, and

What is claimed is:

1. In a spinning reel having a housing, a normally non-rotatable line spool, a carrier adjacent said spool and fixed to a selectively rotatable shaft, a holder mounted on said carrier and slidable between a radially inner and radially outer position, a pickup head extensible outwardly of and retractable with respect to said carrier, a lifter rod mounted in said holder biasing means for urging said holder toward said radially outer position a plunger carried by said housing, a control means exteriorly of said housing for moving said plunger to engage and slide said holder to the radially inner position, a latch mechanism for retaining said holder in said inner position and selectively releasing said holder, the movement of said plunger by said control means also engaging said lifter rod to maintain said pickup head in extended position, biasing means to withdraw said plunger from engagement with said holder and said lifter rod, and further biasing means to retract said pickup head when said plunger head disengages said lifter rod and said holder is latched in said radially inner position.

2. In a spinning reel having a housing, a tubular bearing stationarily secured to said housing, a normally non-rotatable spool mounted exteriorly of said bearing, a drive shaft rotatably mounted through said bearing, a carrier mounted on said shaft adjacent said spool, a plunger axially slidably mounted within said drive shaft, a holder mounted on said carrier and slidable between a radially inner and radially outer position, means for biasing said holder toward said radially outer position, control means exteriorly of said housing for moving said plunger to engage and slide said holder to said radially inner position, a latch mechanism for retaining said holder in said inner position and selectively releasing said holder, a pickup head extensible outwardly of and retractable with respect to said carrier, a lifter rod mounted in said holder, movement of said plunger also engaging said lifter rod to maintain said pickup head in extended position, biasing means to withdraw said plunger head from engagement with said holder and said lifter rod, and further biasing means to retract said pickup head when said plunger head disengages said lifter rod and said holder is latched in said radially inner position.

3. A spinning reel, as set forth in claim 2, in which the pickup head it attached to and movable radially with said lifter rod.

4. A spinning reel, as set forth in claim 2, in which the pickup head is mounted directly on said carrier and engageable by the lifter rod mounted on said holder.

5. A spinning reel, as set forth in claim 2, in which the pickup head it attached to an arm rockably mounted on a stud attached to said carrier and said further biasing means rocks said arm to retract the pickup head with respect to said carrier, engagement of said lifter rod with said arm extending said pickup head outwardly of said carrier.

6. In a spinning reel having a housing, a removable cover attached thereto and having a line guiding eyelet, a tubular bearing stationarily secured to said housing and extending interiorly of said cover toward said eyelet, a normally nonrotatable line spool mounted on said bearing, a tubular drive shaft rotatably mounted in said bearing, a carrier mounted on said shaft inside said cover adjacent said spool, manually operative means connected to said shaft from exteriorly of said housing for rotating said shaft, diametrically opposed first and second access bores through said tubular drive shaft, a plunger axially slidably mounted within said drive shaft, control means operative from exteriorly of said housing for moving said plunger axially into blocking position between said first and second bores, biasing means for urging said plunger axially away from said blocking position, a holder mounted on said carrier and slidable between a radially inner and a radially outer position, a further biasing means urging said holder toward said radially outer position, a latch mechanism for retaining said holder in said inner position and selectively releasing said holder, a tumbler pin mounted on said holder in alignment with said first bore, said tumbler pin extending interiorly of said tubular drive shaft when said holder is in radially outer position and clearing the interior of said tubular drive shaft when said holder is in said radially inner position, a lifter rod carried on said holder and slidable with and with respect thereto in alignment with said second bore, a pickup head extensible outwardly of said carrier, means normally biasing said pickup head inwardly of said carrier, said lifter rod extending interiorly of said tubular drive shaft when said pickup head is retracted inwardly of said carrier and engageable with said plunger to selectively extend said pickup head.

7. A spinning reel, as set forth in claim 6, in which the first said access bore is displaced axially of said second access bore so that axial alignment of said plunger blocks said first bore sequentially after blocking said second bore.

8. A spinning reel, as set forth in claim 7, in which the ends of the lifter rod and tumbler pin extensible interiorly of said tubular shaft are beveled matingly to engage a beveled work surface on said plunger so that axial movement of said plunger will cause the work surface thereon to move said lifter rod and tumbler pin radially outwardly thereof.

9. A spinning reel, as set forth in claim 8, in which the pickup head it attached to and movable radially with said lifter rod.

10. A spinning reel, as set forth in claim 8, including means mounting the pickup head directly on said carrier in a position to be engaged by the lifter rod mounted on said holder.

11. A spinning reel, as set forth in claim 10, in which the pickup head is secured to an arm, pivot means rockably mounting said arm on said carrier, a camming surface extends along said arm and is engageable by a shoulder on said holder.

12. A spinning reel, as set forth in claim 11, in which the arm rocks about said pivot means and the shoulder is movable radially outwardly beyond said pivot means to lock said pickup head outwardly of said carrier.

References Cited

UNITED STATES PATENTS

| | | | |
|---|---|---|---|
| 2,854,200 | 9/1958 | Montgomery | 242—84.21 |
| 3,059,873 | 10/1962 | Hull | 242—84.2 |
| 3,142,454 | 7/1964 | Hull | 242—84.2 |
| 3,146,965 | 9/1964 | Khazzam | 242—84.2 |
| 3,284,019 | 11/1966 | Wood | 242—84.21 |

FRANK J. COHEN, *Primary Examiner.*

B. S. TAYLOR, *Assistant Examiner.*